May 12, 1970  A. G. JENNETTI  3,512,161

THIRD MODE SUPER-DIRECTIVE SLOT ANTENNA

Filed March 14, 1968  8 Sheets-Sheet 1

INVENTOR
ANTHONY G. JENNETTI

BY
*Anthony D. Cennamo*
ATTORNEY f=1010 MHZ

FIG. 3A f=1300 MHZ

FIG. 3B f=1720 MHZ

FIG. 3C f=2010 MHZ

INVENTOR
ANTHONY G. JENNETTI

BY

ATTORNEY

FIG. 5C  VERY LARGE GROUND PLANE
FIG. 5B  MODERATE SIZE GROUND PL.
FIG. 5A  NO GROUND PLANE

INVENTOR.
ANTHONY G. JENNETTI
BY
ATTORNEY

ANTENNA
FIG. 8A

CROSS SECTION VIEW OF PROBE 28
FIG. 8B

May 12, 1970  A. G. JENNETTI  3,512,161
THIRD MODE SUPER-DIRECTIVE SLOT ANTENNA

Filed March 14, 1968  8 Sheets-Sheet 5

FIG. 11A — SIDE VIEW OF ANTENNA

FIG. 11B — CROSS SECTION OF REAR PROBE ASSEMBLY

INVENTOR.
ANTHONY G. JENNETTI
BY
ATTORNEY

United States Patent Office 3,512,161
Patented May 12, 1970

3,512,161
THIRD MODE SUPER-DIRECTIVE SLOT ANTENNA
Anthony G. Jennetti, Lebanon, Pa., assignor to The Ohio State University Research Foundation, Columbus, Ohio
Filed Mar. 14, 1968, Ser. No. 713,033
Int. Cl. H01q 13/10
U.S. Cl. 343—771                     8 Claims

ABSTRACT OF THE DISCLOSURE

The invention is for super-directive broad-band slot antennas, with increased directivity accomplished by excitation of a single 3rd order mode is a dielectric-loaded waveguide.

BACKGROUND

Previous work with the $H_{03}$ and related modes has been limited to the helical dipole and the large dish antennas. Prior work with the helical dipole has been confined to antennas in which the physical length of the antenna is one-half wavelength. The third mode excitation on these antennas is frequency dependent and therefore the antennas are not broad-band devices. The 3rd order mode at a low level has been used in conjunction with the dominant 1st order mode to decrease or eliminate the side-lobes from the patterns produced by the dish antennas.

SUMMARY OF THE INVENTION

The invention relates to a super-directive, broad-band slot antenna consisting of a dielectric-loaded waveguide in which the 3rd order mode is excited. Basically two different means are employed to achieve the desired excitation. Resistance or metal plates are inserted at the third order mode zero crossings so that, by attenuation means, only the $H_{03}$ mode is propagated. The second means places the exciting probe at the one-half wavelength point producing only the third order mode because the first order mode cannot exist in the half-wavelength structure. The last mentioned antenna can be tuned electronically by means of a coaxial adjustable short or a two-varactor tuning network which permits impedance matching and therefore the desired mode.

The slot antenna of the invention produces better than 33 percent increase in directivity compared to a conventional slot over a 2:1 bandwidth but is as simple and practical for aircraft applications as a conventional cavity-backed slot antenna. The antenna pattern has many of the characteristics of a two-element array with sin $\theta$ element factor, but this is accomplished with a single half-wavelength slot antenna, thus resulting in a space reduction. Increased directivity is accomplished through excitation of a single third order mode in a dielectric-loaded waveguide.

The invention can be used on supersonic transport and other high performance aircraft. The invention is the first broad-band (2:1) super-directive antenna. Communications, homing, and direction finding for HF and VHF frequencies are among the uses for the invention. Electronic impedance matching is possible and the integrated antennas and circuits approach can be used with the electronically tuned $H_{03}$-mode slot antenna.

OBJECTS

Accordingly it is a principal object of the invention to provide an improved aperture slot antenna.

Another object of the invention is to provide a slot antenna with substantially increased directivity when compared to conventional slot antennas.

Another object of the invention is to provide an aperture antenna that is super-directive over a 2:1 bandwidth.

Another object of the invention is to provide a super-directive aperture antenna which permits in a single half-wavelength slot antenna many of the characteristics of a two-element array with sin $\theta$ element factor, thereby resulting in a space reduction.

A further object of the invention is to provide an electronically tuned $H_{03}$-mode slot antenna which can be used with an integrated antenna and circuit approach.

Still a further object of the invention is to provide a super-directive antenna which has applications in communications, homing, and direction finding for HF and VHF frequencies.

For a complete understanding of the invention, together with other objects and advantages thereof, reference may be made to the accompanying drawings, in which:

DETAILED DESCRIPTION OF THE DRAWINGS

Figure 1:
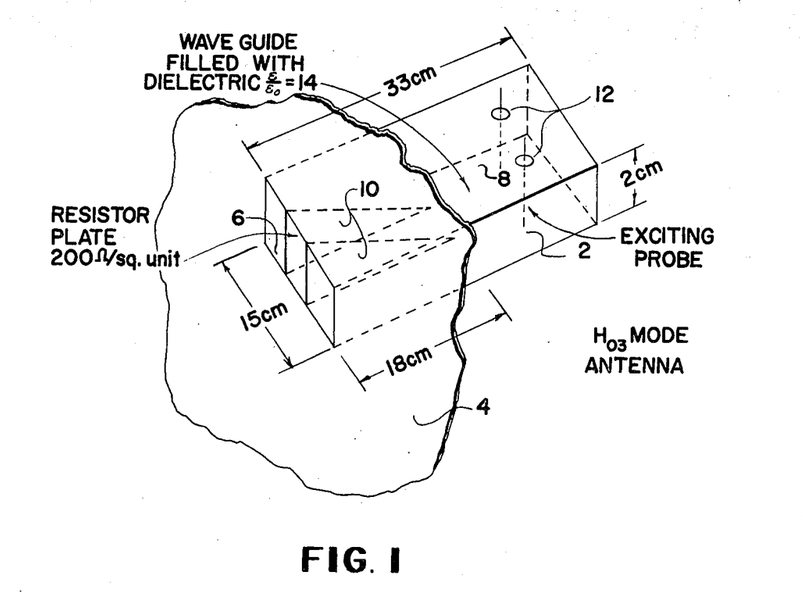
FIG. 1 is a perspective view of the resistance-plate slot antenna.

A preferred embodiment of the invention is illustrated in FIG. 1. The antenna consists of a waveguide slot antenna 2 attached to a ground plane 4 at a discontinuity in the ground plane 4 to permit free radiation at the waveguide aperture 6. The cavity 8 of the waveguide 2 is filled with dielectric ($\epsilon_r=14$), and the waveguide aperture 6 has the physical dimensions of 15 cm. by 2 cm. The higher order modes, as well as the $H_{01}$ mode, naturally exist in the waveguide and means must be used to eliminate the undesired modes. The third order, $H_{03}$ mode is produced alone in this embodiment by the placing of tapered resistance plates 10 at the two zero-crossings of the $H_{03}$ mode. These tapered resistance plates 10 consist of thin sheets of resistive material with a resistance of 200 ohms per square unit. With this positioning of the resistance plates 10 the $H_{03}$ mode is unaffected by the plates while the other modes, which are not at zero value at these points, are greately attenuated.

The waveguide 2 is fed by a stripline network which excites two probes 12 inserted in the waveguide 2. The probes 12 are symmetrically positioned in relationship to the longitudinal center line of the waveguide 2. While it is not essential to the operation of the antenna, the best performance is attained when the probes 12 are positioned at 1/6 of the waveguide width from the side walls of the waveguide 2. This is because this position is at two of the three peak values of the $H_{03}$ mode. Feeding of the $H_{03}$ peak value at the longitudinal center line is possible but this would also feed the $H_{01}$ mode at its peak value, thus, reducing the antenna's performance.

Figure 2:
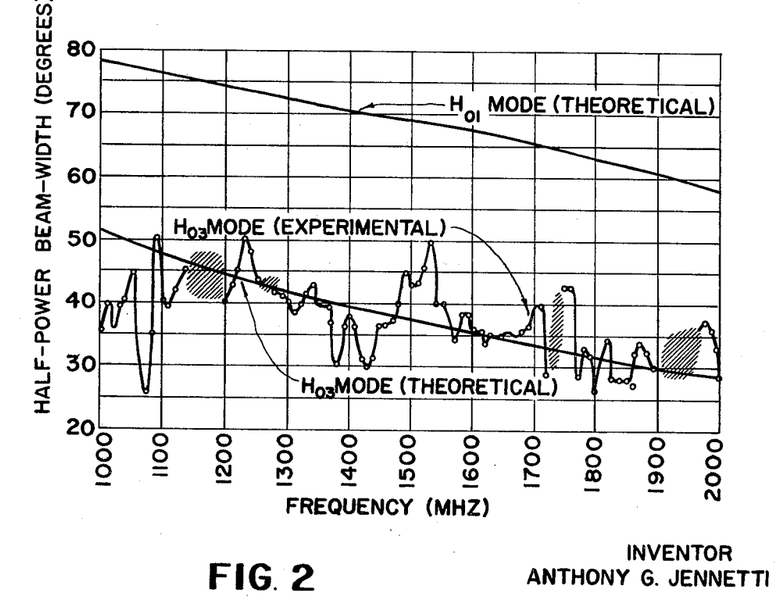
FIG. 2 is a graphical representation of the pattern half-power beam widths obtained over a 2:1 bandwidth from the resistance-plate slot antenna.
Figure 3A:
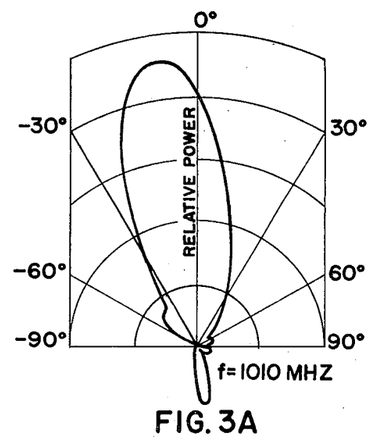
FIG. 3 is a graphical representation of typical patterns (FIGS. 3a, 3b, 3c, and 3d) from the resistance-plate slot antenna.
Figure 3B:
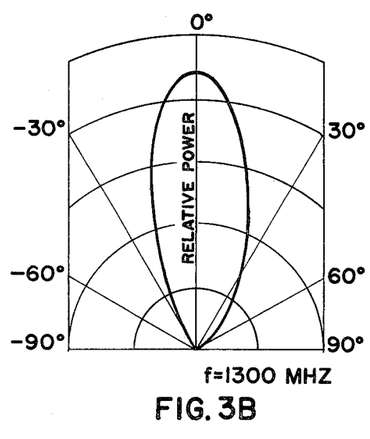
Figure 3C:
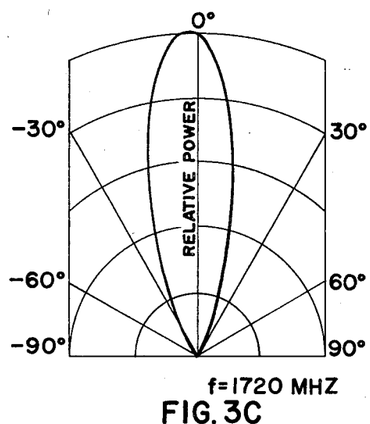
Figure 3D:
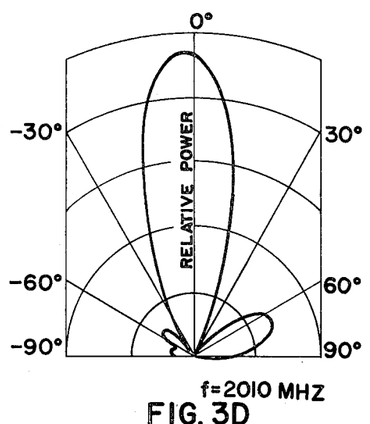

FIG. 2 shows the pattern half-power beam widths obtained from this antenna over a 2:1 bandwidth with data taken at approximately 10 mHz. intervals. It can be seen that the experimental results show good agreement with the theoretical results. Spurious radiation occurred in the narrow dashed portions of FIG. 2. Patterns indicating the side-lobe levels typical over the frequency band are shown in FIG. 3. All the results shown in these two figures were obtained for the antenna without a ground plane (i.e., an open-ended waveguide) which explains the back radiation in some patterns. Thus, this embodiment, which utilizes a lossy network and a frequency-independent property of the $H_{03}$ mode, has been shown experimentally to possess increased-directivity patterns over a 2:1 bandwidth without adjustments in feed position.

Figure 4:
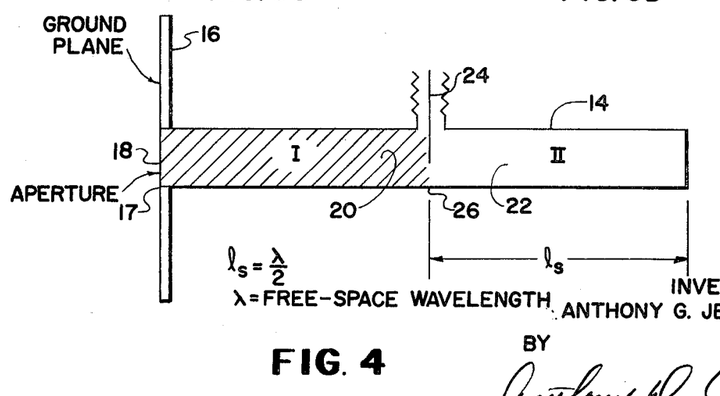
FIG. 4 is a cross-sectional view of the reactive-filter slot antenna.
Figure 8A:
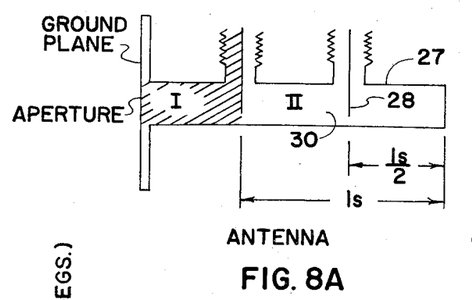
FIG. 8 is a cross-sectional illustration of the reactive-filter slot antenna (FIGS. 8a and 8b) with provision for tuning through a coaxial adjustable short.
Figure 8B:
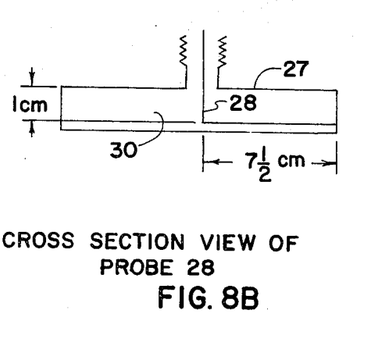

Both of the antenna embodiments illustrated in FIGS. 4 and 8 utilize the antenna cavity as a mode filter to achieve the desired single $H_{03}$ mode. The antenna embodiment of FIG. 4 is not tunable, while the antenna embodiment of FIG. 8 may be tuned to obtain the maximum signal and increased impedance bandwidth. Also, in both antennas, both of the feed probes are located on the longitudinal center line of the waveguide.

The antenna illustrated in FIG. 4 consists of a waveguide slot antenna 14 attached to a ground plane 16 at a discontinuity in the ground plane 17 to permit free radiation at the waveguide aperture 18. The waveguide aperture 18 has the physical dimensions of 2 cm. by 15 cm. The cavity of the waveguide 14 consists of two regions. Region I, 20, is filled with a dielectric ($\epsilon_r=14$) and Region II, 22, is air. The electromagnetic energy is coupled to the antenna 14 by means of a probe 24 inserted into the waveguide cavity at the junction 26 of Regions I and II. The longitudinal length of Region II, 22, is one-half the $H_{01}$ mode wavelength. With this configuration the third order mode will be radiated by the antenna 14.

Figure 5A:
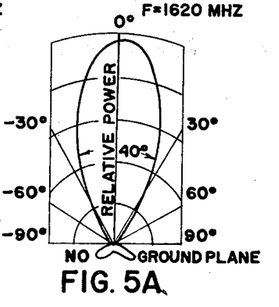
FIG. 5 is a graphical representation of typical patterns for three cases (FIGS. 5a, 5b, and 5c) obtained from the reactive-filter slot antenna.
Figures 5B, 5C:
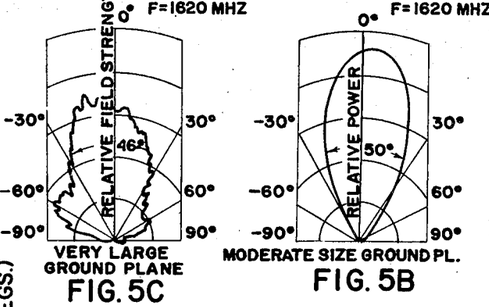
Figure 6:
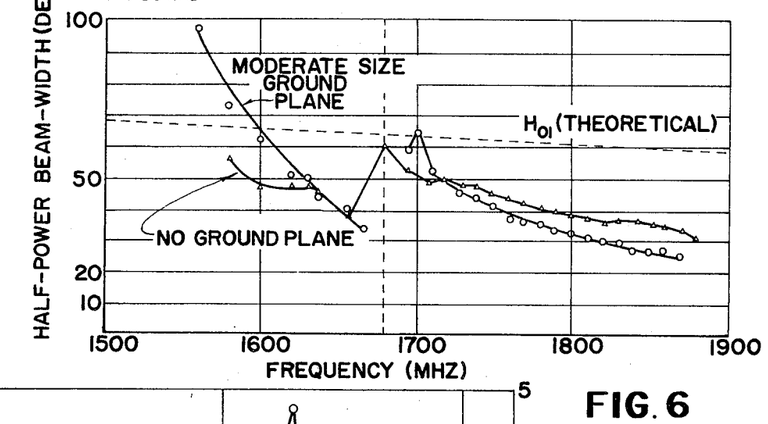
FIG. 6 is a graphical representation for two cases over a 300 mHz. frequency range obtained from the reactive-filter slot antenna.
Figure 7:
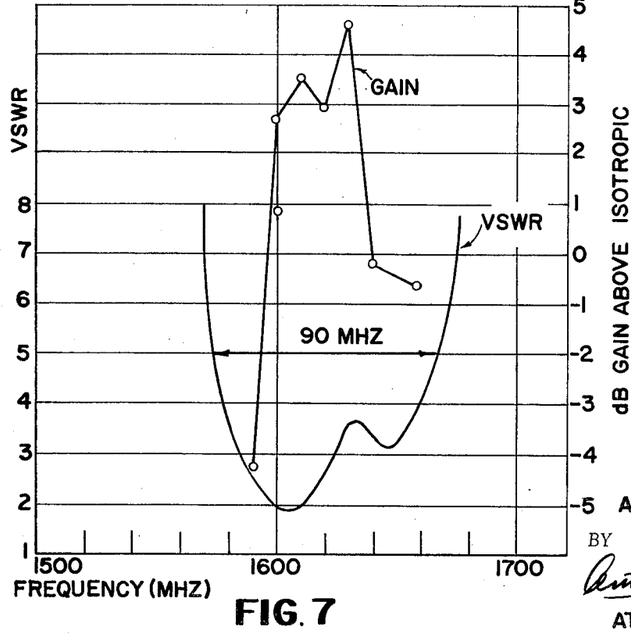
FIG. 7 is a graphical representation of the measured gain and VSWR of the reactive-filter slot antenna.

Patterns were measured for three cases (a) without a ground plane, (b) with a moderate size ground plane, and (c) with a very large ground plane. Representative patterns for these three cases are illustrated in FIG. 5 where it can be seen that the patterns have roughly similar characteristics. It should be noted that the pattern for the large ground plane case is a field pattern and hence appears wider, while the half-power beamwidth is actually less than that of the other two cases. Nevertheless, qualitative agreement for these three cases is clearly evident. Pattern results for cases (a) and (b) over a 300 mHz. frequency range are given in FIG. 6 with the corresponding $H_{01}$ mode results for comparison. Not shown is the side lobe information. At frequencies below 1800 mHb. side-lobes were not observed on a linear power plot. Between 1800–1840 mHz. they are less than $-10$ db, but rise rapidly above 1840 mHz. to a high level ($-3$ db) at the last point. The measured gain and VSWR is shown in FIG. 7. The gain measurements do not include the effects of mismatch loss, which would improve the results. As can be seen in FIG. 7, optimum gain occurs at the lower VSWR levels. These curves illustrate that moderate increased-directivity antennas are practical and that reasonable VSWR can be obtained. The antenna illustrated in FIG. 4 is much smaller in depth than the antenna illustrated in FIG. 1.

The antenna embodiment 27 illustrated in FIG. 8 is an extension of the last mentioned embodiment, in that the same antenna is used, but it is now tuned through a coaxial adjustable short 28. This short 28 is placed in the waveguide cavity in Region II, 30, on the longitudinal center line of the waveguide. By adjusting this short 28 the effective electrical size of the waveguide 22 is changed. This permits tuning of the antenna 27 to obtain the maximum signal and increased impedance bandwidth. This configuration was chosen because coaxial tuning lends itself almost directly to voltage tuning techniques using varactors, so that integrated antennas and circuits approach may be used.

Figure 9:
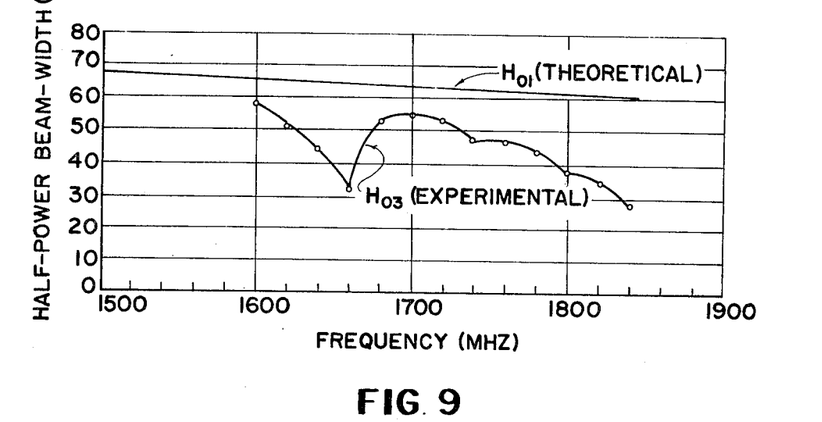
FIG. 9 is a graphical representation of measured pattern results from the antenna illustrated in FIG. 8.
Figure 10:
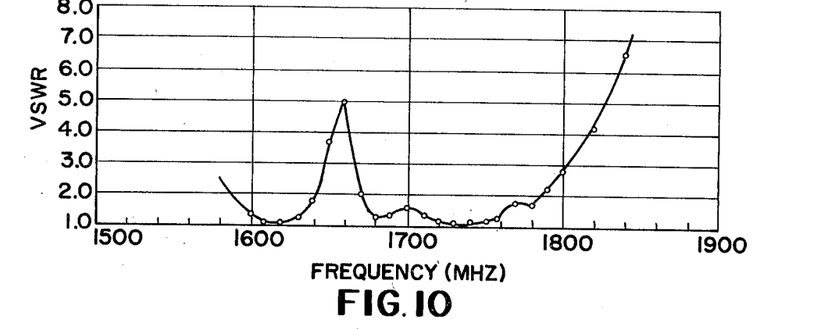
FIG. 10 is a graphical representation of the VSWR data from the antenna illustrated in FIG. 8.

The measured pattern results for this antenna with a 15" x 15" ground plane are given in FIG. 9 with corresponding results for the $H_{01}$ mode shown for comparison. The comments given on side lobe levels for the untuned antenna of FIG. 4 apply here also. At each frequency point in FIG. 9 the single, adjustable short was tuned for maximum signal; a pattern was then taken, and the VSWR was measured. The VSWR data are illustrated in FIG. 10 where it can be seen that, except for two points, the VSWR was below 2:1 over a 190 mHz. range. Thus, the impedance bandwidth has been increased through simple turning techniques. The reactive-filter slot antennas illustrated in FIGS. 4 and 8 utilize relatively lossless components to achieve mode filtration but are not as broad-band as the resistance plate antenna of FIG. 1.

Figures 11A, 11B:
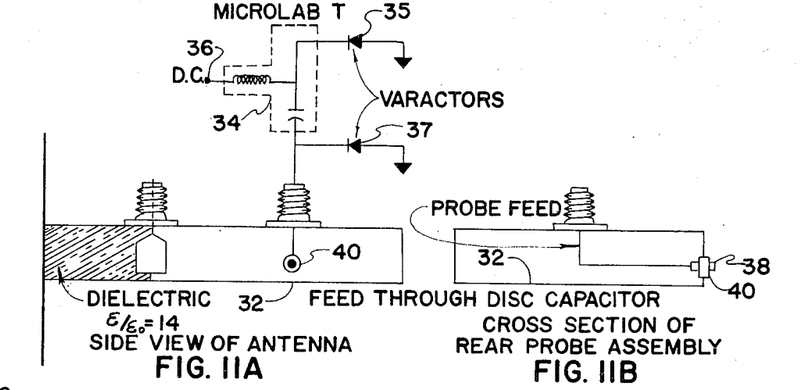
FIG. 11 is a cross-sectional view of the electronically tuned $H_{03}$-mode slot antenna.

The antenna 32 illustarted in FIG. 11 is a version of the antenna in FIG. 8, in which the antenna cavity acted as a mode filter permitting radiation of the $H_{03}$ mode. A two-varactor tuning network 34 has been substituted for the adjustable short. A varactor is a semiconductor device in which a variation of the voltage across its terminals produces a change in capacitance acros the same two terminals. This capacitance is produced by the properties of the semiconductor junction when the device is reverse-biased.

The two varactors replace the coaxial adjustable short utilized in the embodiment illustrated in FIG. 8, and for the purposes of the invention perform the same function as the short. It can be seen in FIG. 11 that DC bias is supplied at two places 36 and 38 corresponding to the varactors 35 and 37; one DC lead 36 is through a feedthru disc capacitor 40 situated in the wall of the waveguide 32. In this way, the two variactors can be independently controlled to give the greatest possible number of combinations of individual values of reactance at the point of the probe feed.

Figure 12:
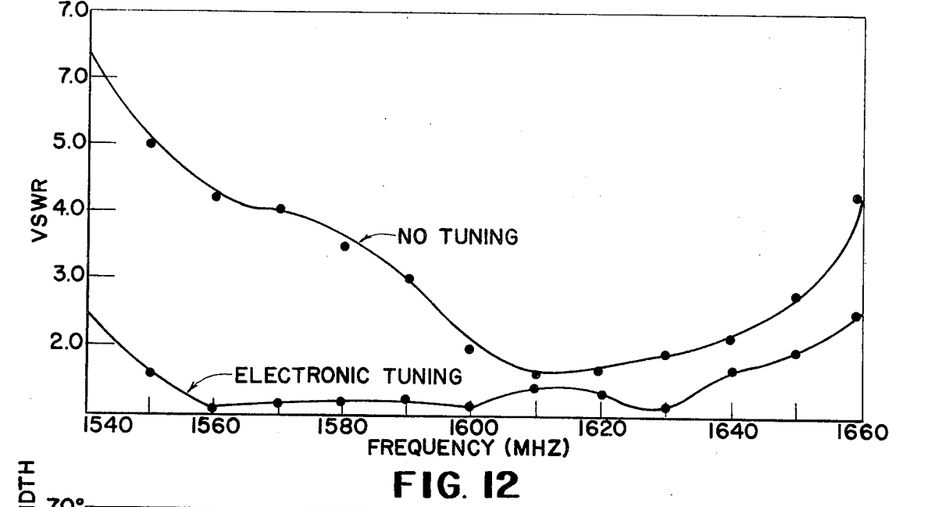
FIG. 12 is a graphical representation of the impedance results obtained through electronic tuning of the antenna illustrated in FIG. 11.
Figure 13:
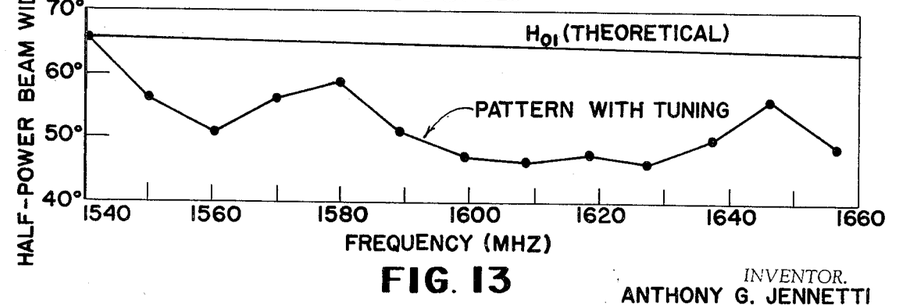
FIG. 13 is a graphical representation of the pattern results obtained from the antenna illustrated in FIG. 11.

These two variactors, 35 and 37, make possible electron impedance matching and the results are shown in FIG. 12. Each data point represents the optimum VSWR that was obtained with the network in FIG. 11. Pattern results corresponding to the VSWR data are shown in FIG. 13 where the half-power beam width is plotted. There it can be seen that the resulting patterns were better than those obtainable from the $H_{01}$ mode. Also, side-lobes were not observed.

Figure 14:
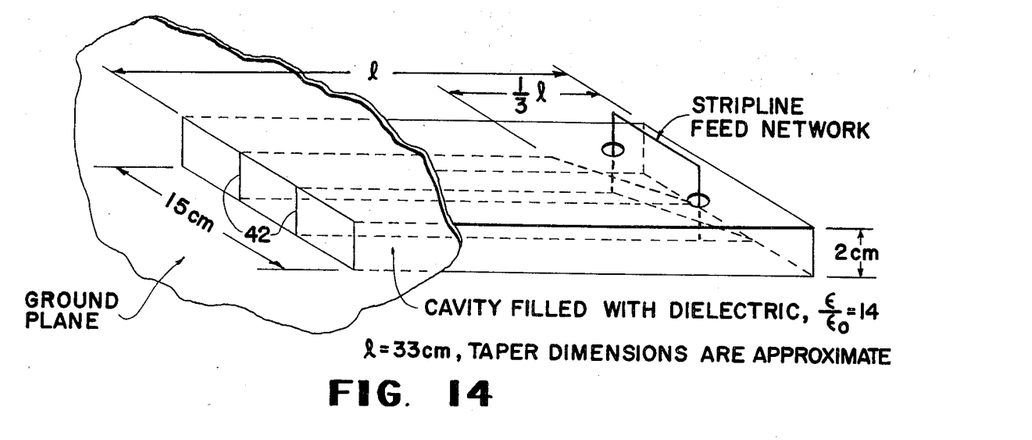
FIG. 14 is a perspective view of the metal-plate $H_{03}$-mode slot antenna.
Figure 15A:
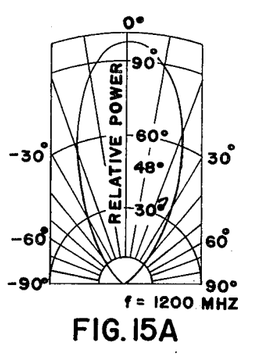
FIG. 15 is a graphical representation of the measured patterns (FIGS. 15a, 15b, and 15c) of the antenna illustratde in FIG. 14.
Figure 15B:
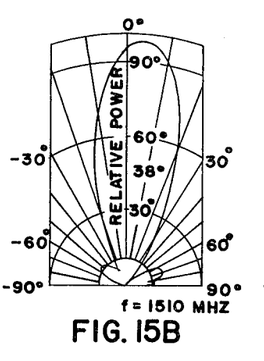
Figure 15C:
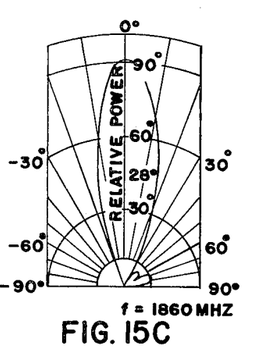

The antenna embodiment shown in FIG. 14 uses the same principle as that shown in FIG. 1, but is more efficient because it is constructed with lower loss materials. Metal plates 42 are used instead of resistance plates. Measurements have shown that metal plates 42 provide attenuation on the order of 5 db/λ. This value of attenuation is not as much as with resistance plates but it is sufficient. Several measured patterns of the antenna in FIG. 14 are shown in FIG. 15. The patterns, in general, show good agreement with theory.

Figure 16:
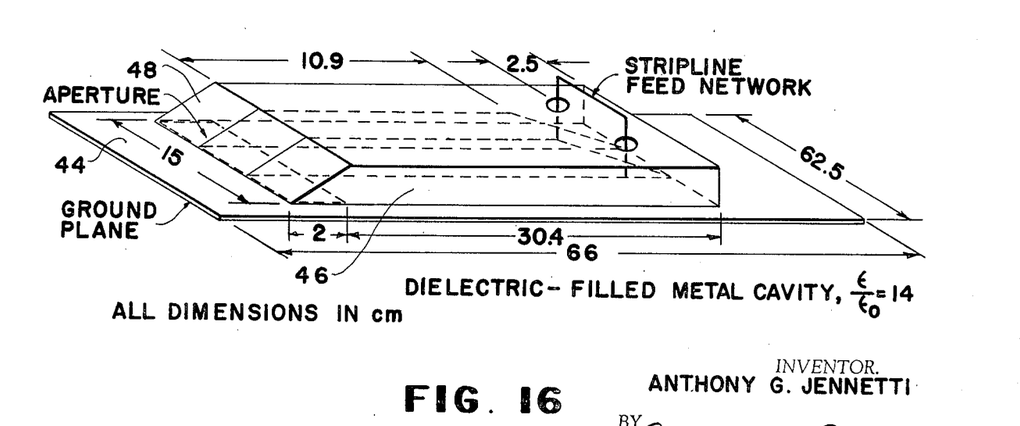
FIG. 16 is a perspective view of the folded metal-plate slot antenna.
Figure 17:
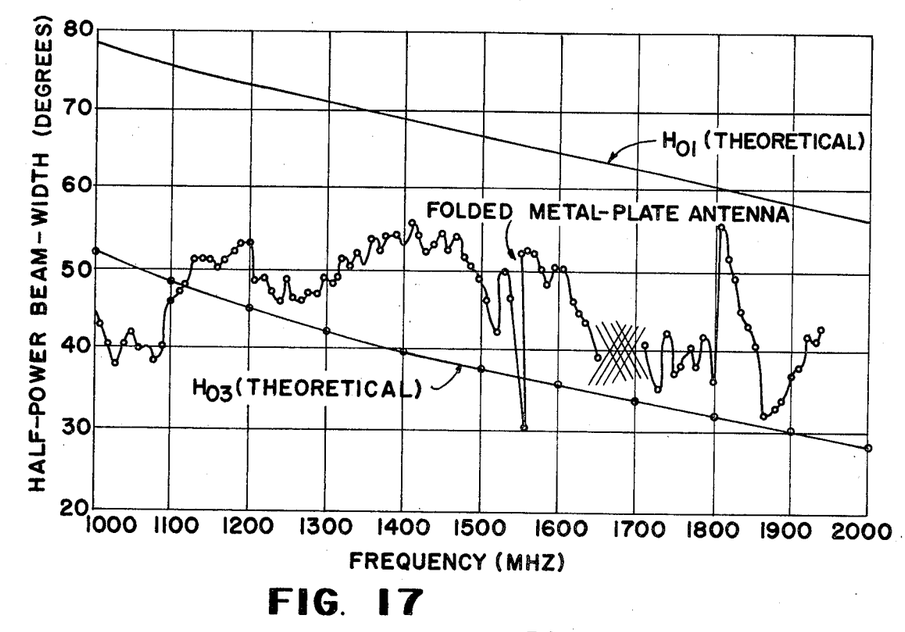
FIG. 17 is a graphical representation of pattern results over a 2:1 bandwidth from the antenna illustrated in FIG. 16.

To reduce the depth of the cavity protruding behind the ground-plane 44, the antenna was folded as shown in FIG. 16. The cavity 46 and the folded section 48 were both dielectric-filled ($\epsilon_r = 14$). Patterns were measured at 10 mHz. intervals in the region 1–2 gHz. The resulting half-power beamwidth for each of the patterns is shown in FIG. 17. Generally, adequate performance was obtained over most of the frequency region. While the patterns were not as close to the theoretical as the resistance-plate antenna, a distinct improvement in patterns over those of the conventional $H_{01}$ was observed.

The following analysis provides a complete understanding of the theory underlying the operation of the antenna disclosed herein.

Figures 18, 19:
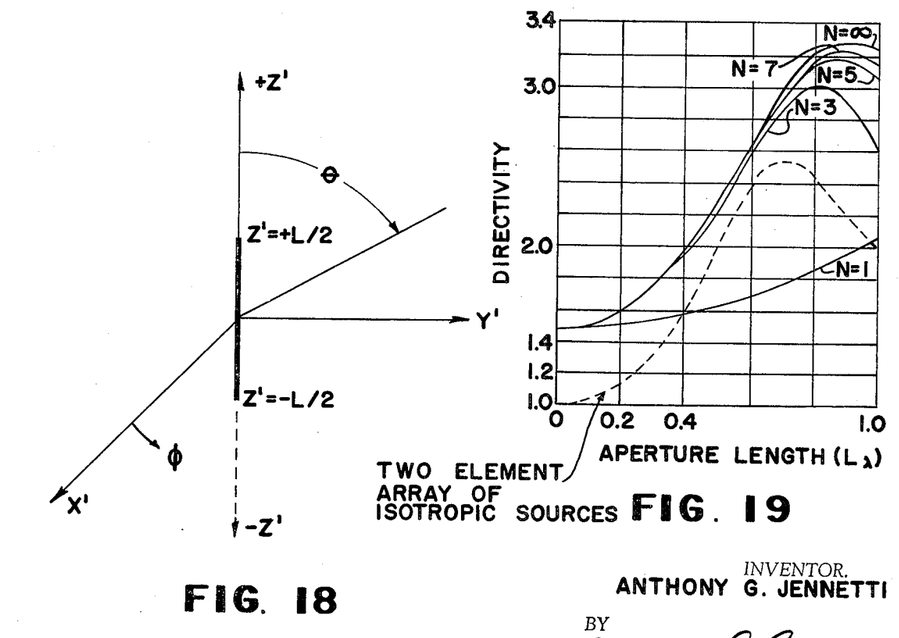
FIG. 18 is a graphical representation of the coordinate system of the line source antenna which is used for discussion of the third order mode in the theory of the invention.
FIG. 19 is a graphical representation of the theoretical directivity for the $H_{0n}$ rectangular waveguide modes, where $n$ is odd, as a function of the aperture length of the line source antenna illustrated in FIG. 18.

For the sake of simplicity we will consider the antenna to be a line source of length $L_\lambda = L\lambda$ located along the $z'$ axis, centered at $z' = 0$ as illustrated in FIG. 18. An aperture distribution, $A(z')$, exists along the structure and is given by:

(1) $$A(z') = \cos \frac{n\pi z'}{L}$$

where $n$ is the mode number and is considered odd. The far-field $F(k \cos \theta)$ is related to the aperture distribution by (2) $$F(k \cos \theta) = \sin \theta \int_{-L/2}^{L/2} A(z') e^{jkz'} \cos \theta \, dz'$$

where $k = 2\pi/\lambda$. Decomposing Eq. 1 into two traveling waves gives for the far-field.

(3) $$F(k \cos \theta) = \frac{n\pi}{L_\lambda} (-1)^{(n-1/2)} \sin \theta \frac{\cos (\pi L_\lambda \cos \theta)}{\cos^2 \theta - n^2/4L_\lambda^2}$$

where $L_\lambda = L/\lambda$. For the case $n=1$ and $L_\lambda = \frac{1}{2}$, Eq. 3 reduces to the dipole (or thin slot) formula. However, for the case where $n$ becomes large Eq. 3 approaches the form (4) $$F(k \cos \theta) \cong \sin \theta \cos (\pi L_\lambda \cos \theta)$$

Thus, it approaches the pattern of a two-element linear array with sin θ element factor. However, as will be seen later, $n=3$ gives a good approximation to this.

A theoretical plot of directivity vs. aperture length ($L_\lambda$) is given in FIG. 19. As can be seen, third order mode excitation results in better than a 33 percent increase in directivity compared to the conventional slot antenna mode ($n=1$) over a 2:1 bandwidth and also that little is to be gained in directivity by exciting the 5th and 7th mode. A two-element array of isotropic point sources is shown also for comparison.

Figure 20:
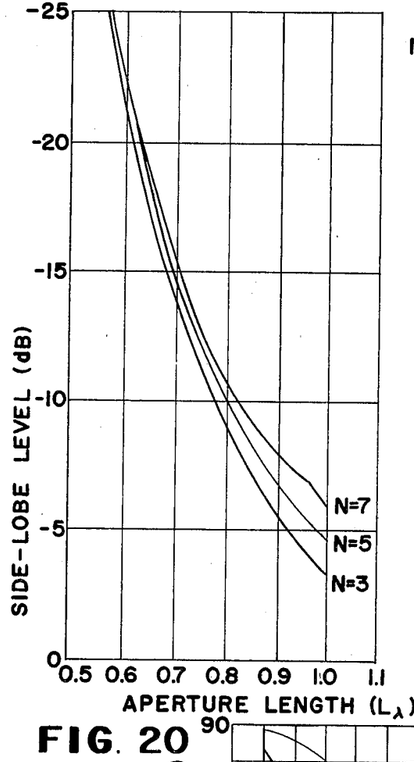
FIG. 20 is a graphical representation of the theoretical side-lobe level of the $H_{03}$, $H_{05}$, and $H_{07}$ rectangular waveguide modes as a function of the aperture length of the line source antenna illustrated in FIG. 18.

A theoretical plot of side-lobe level is given in FIG. 20, where it can be seen that for the $n=3$ case the side-lobe level is below 10 db for $L_\lambda \leq 0.75$. This value is better than a conventional two-element isotropic array. This improvement is due to the sin θ factor in Eq. 3.

Figure 21:
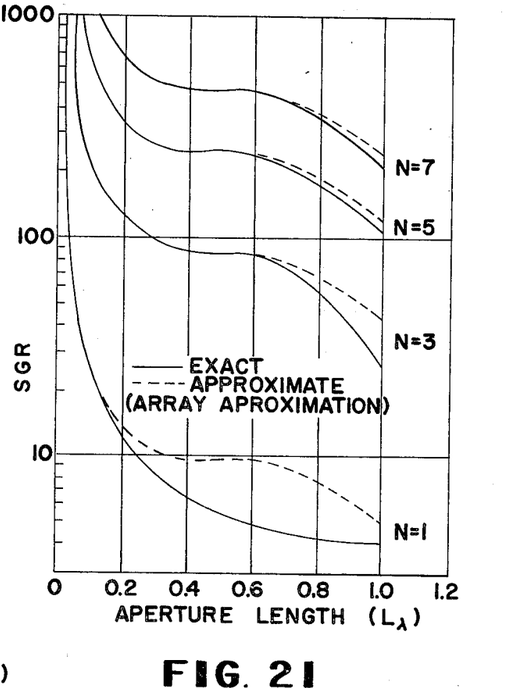
FIG. 21 is a graphical representation of the theoretical super-gain ratio (SGR) for the $H_{0n}$ rectangular waveguide modes, where $n$ is odd, as a function of the aperture length of the line source antenna illustrated in FIG. 18; and, FIG. 22 is a graphical representation of the calculated half-power beam widths for the $H_{0n}$ rectangular waveguide modes as a function of the aperture length of the line source antenna illustrated in FIG. 18.

An indication of the bandwidth properties of an antenna is the super-gain ratio (SGR), since SGR is related to the aperture Q by $SGR = 1+Q$. The definition used here (5) $$SGR = \frac{\frac{1}{2\pi} \int_{-\pi}^{\pi} |A(p)|^2 dp}{\left(\frac{1}{2\pi}\right)^2 \int_{-L_\lambda}^{+L_\lambda} F(q)^2 dq}$$

where $F(q)$ is related to $A(p)$ by $$F(q) = \int_{-\pi}^{\pi} A(p) e^{jpq} dp$$

$$p = \frac{2\pi z'}{L}, \quad q = \frac{L}{\lambda} \cos \theta$$

and $A(z')$ is transformed to $A(p)$. A plot of SGR for the various modes is given in FIG. 21. A working approximation is to say that SGR increases as $n^2$.

Higher order modes exist naturally in waveguide and are frequency independent. Theory states that the $\overline{E}$ field of the waveguide mode is the electromagnetic dual of the current distribution that we have been trying to achieve. Therefore, the patterns obtained from waveguide will be the same as those calculated from the current source. Thus, FIGS. 19, 20, and 21 apply exactly for the patterns and results of the waveguide antennas disclosed herein.

Figure 22:
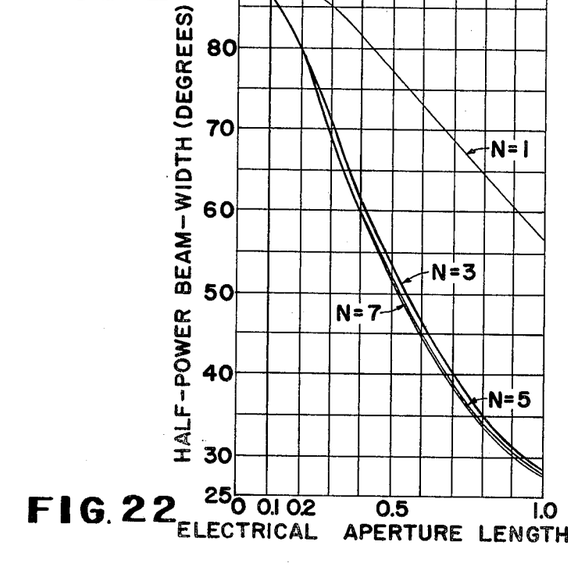

FIG. 22 is a graphical representation of the calculated half-power beam widths obtained from individual excitation of the $H_{01}$, $H_{03}$, $H_{05}$, and $H_{07}$ rectangular waveguide modes. The calculations in FIG. 22 are correct within 0.2°. In FIG. 22 it can be seen that for $L_\lambda = 0.50$, the half-power beam width from the $H_{03}$ mode is better than the $H_{01}$ mode of twice the aperture ($L_\lambda = 1.0$). Comparable results also hold for directivity as shown in FIG. 19. Also, as can be seen in FIG. 22, modes higher than the $H_{03}$ mode offer little improvement. Consequently, our interest is in the $H_{03}$ mode.

Although certain and specific embodiments have been illustrated, it is to be understood that modifications may be made without departing from the true spirit and scope of the invention.

What is claimed is:

1. A super-directive broad-band slot antenna comprising a dielectric-loaded rectangular waveguide; a ground plane; means for securely attaching said waveguide with the longitudinal axis thereof at right angles to said ground plane, the aperture of said waveguide positioned at the ground plane end of said waveguide, said ground plane having a discontinuity, said aperture coplanar with said ground plane in said discontinuity to permit free radiation; tapered resistance plates positioned within said waveguide at the two zero-crossings of the $H_{03}$ rectangular waveguide mode; means for coupling electromagnetic energy to said waveguide, said coupling means comprising probes inserted in said waveguide symmetrically about the longitudinal center line of said waveguide, said probes fed by a stripline network.

2. A super-directive broad-band slot antenna as set forth in claim 1 wherein said waveguide further comprises a dielectrically loaded region and a region of air, said dielectrically loaded region one-half of the waveguide dominant mode wavelength in depth.

3. A super-directive broad-band slot antenna as set forth in claim 1 wherein said tapered resistance plates comprises tapered metal plates.

4. A super-directive broad-band slot antenna as set forth in claim 1 wherein said means for securely attaching said waveguide with the longitudinal axis thereof is parallel to said ground plane.

5. A super-directive broad-band slot antenna as set forth in claim 2 wherein said means for coupling electromagnetic energy to said waveguide further comprises coupling energy at a junction of the said two regions on the longitudinal center line of the said waveguide, said coupling means comprising a coaxial fed probe inserted into said waveguide.

6. A super-directive broad-band slot antenna as set forth in claim 2 wherein said means for coupling electromagnetic energy to said waveguide further comprises coupling energy on the longitudinal center line of said waveguide at a first point at the junction of the said two regions and at a second point at the position in the second region midway between the end wall of said waveguide and said first region.

7. A super-directive broad-band slot antenna as set forth in claim 6 wherein the said means for coupling electromagnetic energy at the first of the said two points is a coaxial fed probe inserted into said waveguide and the said coupling means at the second of the said two points is a coaxial adjustable short to the side wall of said waveguide, wherein the effective electrical size of the waveguide can be controlled.

8. A super-directive broad-band slot antenna as set forth in claim 6 wherein the said means for coupling electromagnetic energy at the first of the said two points is a coaxial fed probe inserted into said waveguide and the said coupling means at the second of the said two points is a two-varactor tuning network which is supplied with a DC bias at two positions corresponding to the said two varactors, wherein the reactance of each of said varactors can individually be varied thereby controlling the effective electrical size of said waveguide.

References Cited
UNITED STATES PATENTS

| | | | |
|---|---|---|---|
| 2,414,376 | 1/1947 | Heim | 343—772 X |
| 2,918,673 | 12/1959 | Lewis et al. | 343—776 X |
| 2,994,869 | 8/1961 | Woodyard | 343—772 X |

HERMAN K. SAALBACH, Primary Examiner

S. CHATMON, Jr., Assistant Examiner

U.S. Cl. X.R.

333—21, 98; 343—756, 772, 785